May 29, 1951   J. BOUCHER   2,554,935
ENDLESS CHAIN FOR CONVEYING TUBES AND OTHER PARTS
Filed July 1, 1948
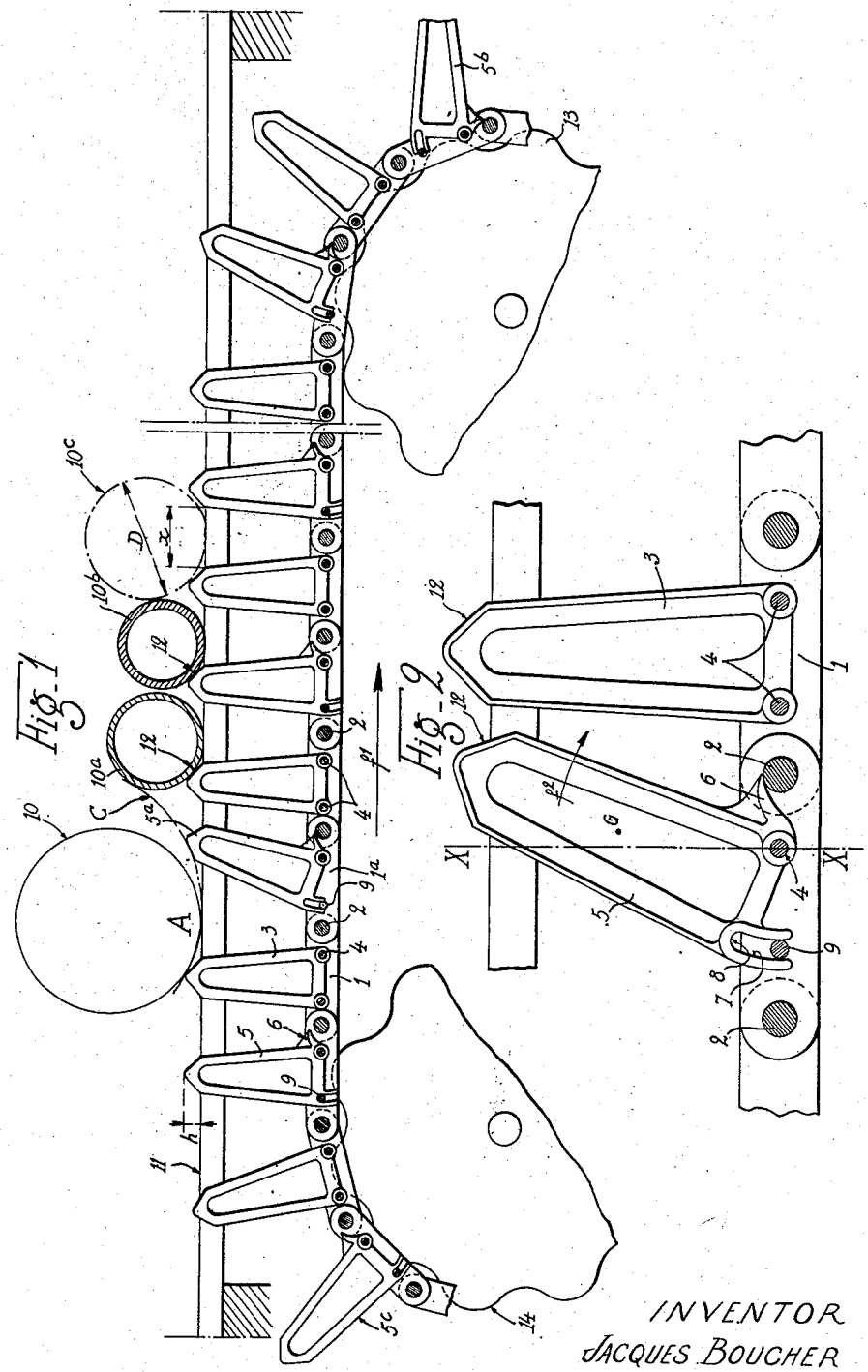
INVENTOR
JACQUES BOUCHER
By Richardson and David
ATTY'S Patented May 29, 1951

2,554,935

UNITED STATES PATENT OFFICE 2,554,935

ENDLESS CHAIN FOR CONVEYING TUBES AND OTHER PARTS

Jacques Boucher, Paris, France, assignor to Compagnie de Pont-a-Mousson, Nancy, France, a French company Application July 1, 1948, Serial No. 36,470
In France February 4, 1948

4 Claims. (Cl. 198—168)

1

The present invention has for its object to provide an improved conveyer chain which is adapted to be used, in particular, for conveying tubes or other parts which are capable of rolling about their axes and which are of different cross-sections.

An object of the invention is to provide a chain, which is of the type comprising teeth carried by the links and which is provided with teeth which are adapted to move on the links that support them, in such a manner as to be able to assume two operative positions.

Owing to this arrangement, the chain can accommodate between two consecutive teeth tubes or other parts of larger transverse dimensions than would be allowed by consecutive stationary teeth.

Other features will become apparent from the ensuing description.

In the accompanying drawing which is given solely by way of example:

Fig. 1 shows a longitudinal section of a portion of a chain according to the invention.

Fig. 2 shows, on a larger scale, a longitudinal section of two links of said chain.

According to the constructional example illustrated, the chain is formed by metal links 1, 1ª which are pivotally connected to one another by cottered spindles 2.

To each link 1 is fixed by means of two cottered pins 4 a tooth 3 which is also made of metal. Each tooth 3 is therefore stationary relative to the link to which it belongs.

To each link 1ª is fixed a tooth 5. The base of said tooth has only one fixing pin 4 which is located at the front relative to the direction of feed of the chain, as shown by the arrow $f^1$ (Fig. 1). Consequently said tooth 5 can oscillate freely about said pin 4.

The front portion of the base of the tooth 5 is provided with a nose 6 which, by abutting against the connecting spindle 2 of two links of the chain, limits the forward swing of said tooth in the direction of the arrow $f^2$ about the pin 4 (Fig. 2).

The rear portion of the base of each tooth 5 is provided with a circular groove portion 7, the centre of which is on the axis of the pivot pin 4 of said tooth. Said groove guides the oscillation of the tooth and the bottom 8 of said groove limits the rearward swing of the tooth by abutting against a pin 9 of the same type as the pin 4.

In this latter position the tooth 5 has the same orientation with respect to the link as the stationary teeth 3.

The shape of each rocking tooth and the positions of its abutments 6 and 8 relative to the pins 2 and 9 are so combined that during the swing of said tooth between the limiting positions respectively corresponding to the contact of the abutment 6 with the pin 2 and to the contact of the abutment 8 with the pin 9, the centre of gravity G (Fig. 2) of said tooth crosses over the vertical line X—X passing through the pivot 4 of the tooth and is finally located towards the abutment which is operative, in such a manner that said tooth is in stable equilibrium for each of the two aforesaid positions.

The chain operates as follows: The chain being assumed to be fed in the direction of the arrow $f^1$ (Fig. 1), a known device of any type, not shown in the drawing, and the movement of which is synchronized as known with the movement of the chain, enables pipes or other cylindrical parts 10 to be placed in position downwardly, at a (Fig. 1), between the consecutive teeth of the chain.

The pipes roll on horizontal lateral rails 11 and are pushed by the front face 12 of the tips of the teeth.

The distance $x$ between the inner edges of two consecutive teeth and also the level $h$ of the rails relative to the ends of said teeth limit the maximum diameter D of the pipes 10ᶜ which can be placed between two consecutive teeth.

When pipes whose diameter is smaller than or at the most equal to said diameter D are placed on the chain, it is possible to arrange a pipe in each intertooth cavity (see the pipes 10ª and 10ᵇ), all the teeth in this case being vertical and each of the rocking teeth being in the stable operative position, the abutment 8 bearing against the pin 9. The contact 8—9 counteracts the thrust reaction of the tooth on the pipe while the chain is moving forward. Each movable tooth therefore behaves exactly like a stationary tooth.

On the other hand, when the diameter of the pipes becomes larger than the diameter D, as in pipe 10 for example, the weight of the pipe placed in position causes the corresponding movable tooth to rock forward to 5ª until its nose 6 bears against the corresponding pin 2. The pipe 10 rests on the rail 11 and the chain can convey it in the same manner as a small diameter pipe.

Of course, the maximum permissible diameter is given by the largest circumference C that can be inscribed between the rail and the inner edges of a stationary tooth and a movable tooth in its rocked position.

Finally, the pipes are preferably arranged in an order of size which enables all the spaces between the teeth to be used, with the exception, however, of the spaces between a straight tooth and the next rocked tooth.

When one of the movable teeth reaches the descending portion of the front outlet sprocket wheel 13, said tooth, if it has not already rocked, rocks to 5$^b$. Then it returns to the vertical position by gravity, on the lower side of the chain and retains this position (which will be the operative position) as it passes over the inlet sprocket wheel 14 (position 5$^c$) and reaches the upper side of the chain in the same position.

Of course, the invention is in no way limited to the example illustrated and hereinbefore described.

Thus, instead of having one movable tooth out of two, it would be possible to use any other combination for example to have groups of consecutive movable teeth separated by one or more stationary teeth, or even to have all the teeth movable, each movable tooth being mounted as hereinbefore explained and as shown in the drawings for teeth 5. Similarly, the retraction of the movable teeth, instead of being effected by rocking forward, could be effected by rocking sideways.

Having now described my invention what I claim as new and desire to secure by Letters Patent, is:

1. In a chain, which is adapted to convey rolling objects of different cross-sections and which comprises longitudinal links and transverse pivot pins by which said links are pivotally connected to one another, the provision of rocking teeth intended to push said objects and pivotally mounted on some at least of said links to oscillate about axes parallel to said pivot pins and for each rocking tooth two sets of two abutments which are provided, in each set, the one on said tooth and the other on the chain itself for determining two operative positions of said tooth, the center of gravity of said tooth being so located with respect to said abutments, when the chain is in its working position, that during the rocking of the tooth the center of gravity of said latter crosses over the vertical of the corresponding axis of oscillation of the tooth so that both operative positions of said tooth are stable.

2. Chain according to claim 1 wherein, for each rocking tooth, one of said two abutments of the chain itself is constituted by one of the two pivot pins of the corresponding link whereas the other of said abutments is constituted by a transverse pin which is parallel to the axis of oscillation of said rocking tooth and is located between said axis and the other pivot pin of articulation of said link.

3. Chain according to claim 2 wherein each rocking tooth is provided with a groove adapted to slide on said transverse pin, the bottom of said groove forming the conjugated abutment carried by said tooth.

4. Chain according to claim 3 wherein the successive rocking teeth are separated by one stationary tooth.

JACQUES BOUCHER.

REFERENCES CITED

The following references are of record in the file of this patent:

UNITED STATES PATENTS

| Number | Name | Date |
| --- | --- | --- |
| 669,111 | Acklin | Mar. 5, 1901 |
| 707,200 | Bollinger | Aug. 19, 1902 |
| 948,678 | Bighouse | Feb. 8, 1910 |
| 1,567,162 | Morgan | Dec. 29, 1925 |
| 1,845,127 | Clark | Feb. 16, 1932 |

FOREIGN PATENTS

| Number | Country | Date |
| --- | --- | --- |
| 620,621 | Germany | Oct. 24, 1935 |